(12) United States Patent
Zohar

(10) Patent No.: US 11,300,171 B2
(45) Date of Patent: Apr. 12, 2022

(54) SPRING APPARATUS

(71) Applicants: Gil Zohar, Ashqelon (IL); Eyal Eliyahu Ashkenazi, Ness Ziona (IL)

(72) Inventor: Gil Zohar, Ashqelon (IL)

(*) Notice: Subject to any disclaimer, the term of this patent is extended or adjusted under 35 U.S.C. 154(b) by 0 days.

(21) Appl. No.: 16/968,881

(22) PCT Filed: Mar. 12, 2019

(86) PCT No.: PCT/IL2019/050270
§ 371 (c)(1),
(2) Date: Aug. 11, 2020

(87) PCT Pub. No.: WO2019/175866
PCT Pub. Date: Sep. 19, 2019

(65) Prior Publication Data
US 2020/0400206 A1    Dec. 24, 2020

Related U.S. Application Data

(60) Provisional application No. 62/642,609, filed on Mar. 14, 2018.

(51) Int. Cl.
| F16F 1/04 | (2006.01) |
| F16F 1/13 | (2006.01) |
| F16F 1/12 | (2006.01) |
| F16F 13/00 | (2006.01) |
| B60G 11/14 | (2006.01) |

(Continued)

(52) U.S. Cl.
CPC ............... F16F 1/13 (2013.01); F16F 1/041 (2013.01); F16F 1/121 (2013.01); F16F 13/007 (2013.01); B60G 11/14 (2013.01); B60G 15/063 (2013.01); B60G 17/021 (2013.01); B60G 2202/12 (2013.01); B60G 2202/312 (2013.01); B60G 2204/1242 (2013.01); B60G 2500/22 (2013.01); B60G 2800/162 (2013.01); F16F 2228/066 (2013.01); F16F 2230/0005 (2013.01); F16F 2230/0041 (2013.01); F16F 2232/08 (2013.01); F16F 2238/026 (2013.01)

(58) Field of Classification Search
CPC .... F16F 1/13; F16F 1/041; F16F 1/121; F16F 13/007; F16F 1/122; F16F 2228/066; F16F 2230/0005; F16F 2230/0041; F16F 2232/08; F16F 2238/026
See application file for complete search history.

(56) References Cited

U.S. PATENT DOCUMENTS

| 5,722,645 A | 3/1998 | Reitter |
| 6,471,197 B1 | 10/2002 | Denk et al. |

(Continued)

FOREIGN PATENT DOCUMENTS

| CN | 201582338 U | 9/2010 |
| DE | 10345987 A1 | 4/2005 |

(Continued)

*Primary Examiner* — Thomas W Irvin

(57) ABSTRACT

A spring apparatus (10), including: a spring (12); an elongated object (18A) disposed within and along the spring (12); and a mode-changing assembly (16), for providing a first mode in which a portion (38) of the spring (12) being along the elongated object (18A) is not springy, and a second mode in which an entire of the spring (12) is springy.

4 Claims, 5 Drawing Sheets

(51) Int. Cl.
  *B60G 15/06* (2006.01)
  *B60G 17/02* (2006.01)

(56) References Cited

U.S. PATENT DOCUMENTS

| | | | |
|---|---|---|---|
| 6,902,045 B2 * | 6/2005 | Oliver | B60G 15/063 |
| | | | 188/321.11 |
| 9,140,325 B2 * | 9/2015 | Cox | B60G 11/14 |
| 10,604,207 B2 * | 3/2020 | Winefordner | B60G 11/16 |
| 10,611,428 B2 * | 4/2020 | Winefordner | F16F 1/13 |
| 2005/0258582 A1 | 11/2005 | Chou | |
| 2013/0175394 A1 | 7/2013 | Cipra | |
| 2021/0108693 A1 * | 4/2021 | Schutt | F16F 1/06 |

FOREIGN PATENT DOCUMENTS

| | | |
|---|---|---|
| JP | 5756238 U | 4/1982 |
| JP | 2006214453 B2 | 8/2006 |
| JP | 5587255 B2 | 9/2014 |

\* cited by examiner

FIG 1 - PRIOR ART

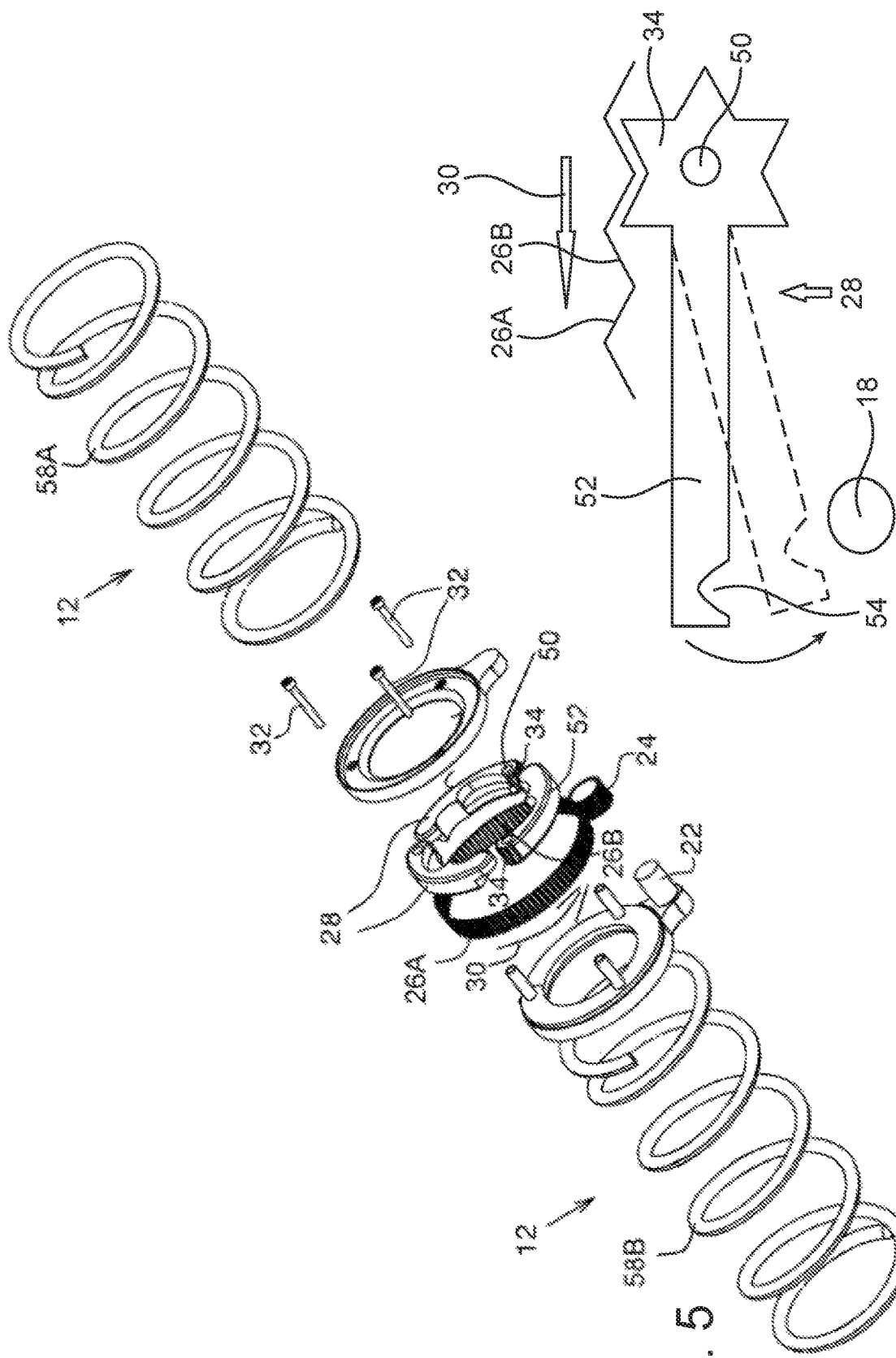

SPRING APPARATUS

TECHNICAL FIELD

The invention relates to the field of shock absorbers, especially for vehicle suspensions.

BACKGROUND

A shock absorber is a mechanical or hydraulic device designed to absorb shock impulses, by converting kinetic energy of the shock into heat which is then dissipated. Typically a hydraulic shock absorber is accompanied by a spring, which ideally only stores the kinetic energy.

FIG. 1 depicts a prior art combination of a shock absorber and a spring.

A prior art combination of a shock absorber and a spring includes a spring 12; a shock absorber cylinder 18A extending along spring 12; a shock absorber piston 18B extending from shock absorber cylinder 18A further along spring 12; a top anchor 14A, for anchoring top of spring 12 to top of shock absorber cylinder 18A; and a bottom anchor 14B, for anchoring bottom of spring 12 to the bottom of shock absorber piston 18B.

However, most vehicles are equipped with suspension springs of a predetermined length which cannot be adjusted to better suit the road conditions. Generally, for vehicles which travel on highways, the most suitable suspension springs are short springs while for terrain vehicles the most suitable suspension springs are relatively long springs. Use of an inadequate suspension spring in a vehicle may contribute to reducing the lifespan of the vehicle's suspension system and contributes to an uncomfortable ride.

SUMMARY

A Spring Apparatus, Including:
a spring;
a shock absorber; and
an embracing assembly.

BRIEF DESCRIPTION OF THE DRAWINGS

FIG. 5 is a perspective exploded view of the spring of the spring apparatus of FIG. 2.

FIG. 6 explains the motion of the embracing member of FIG. 4.

DETAILED DESCRIPTION

Figure 2:
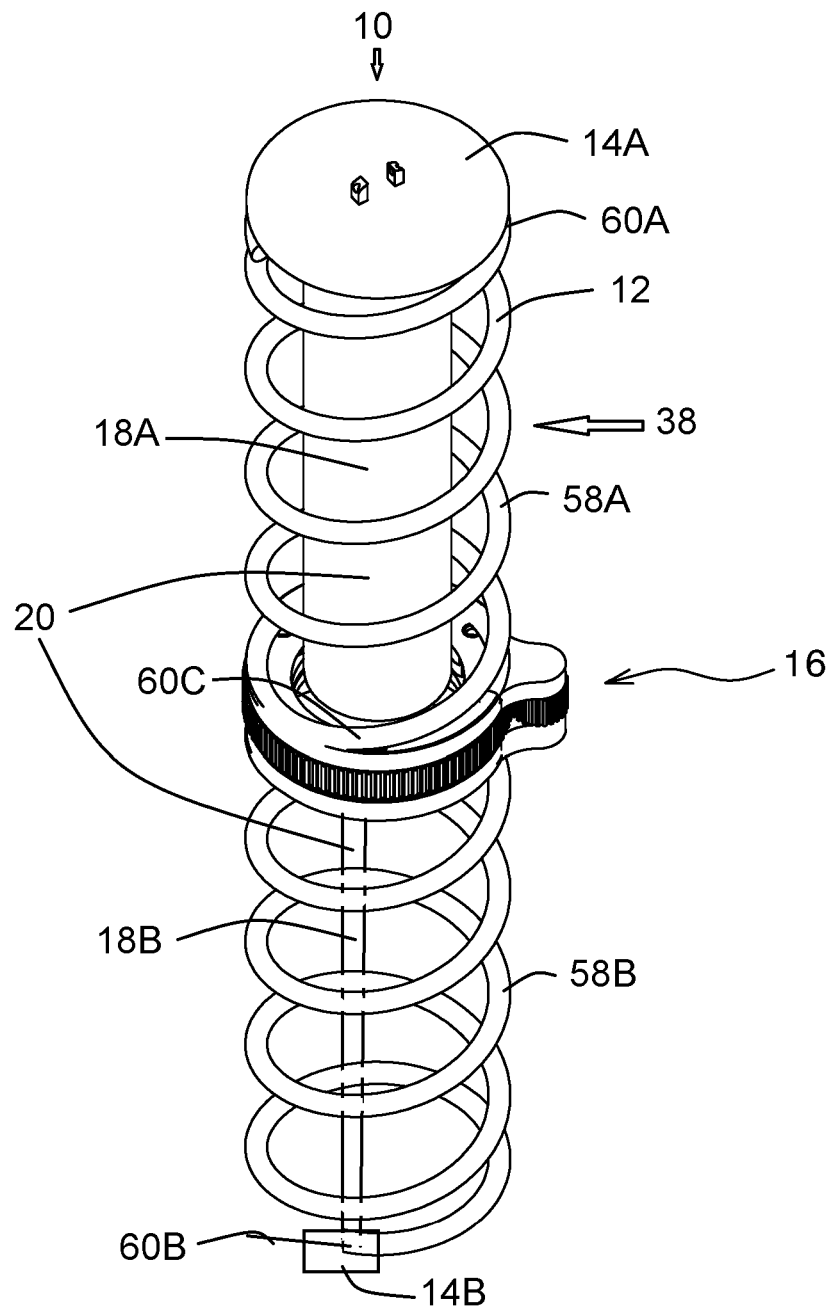
FIG. 2 depicts a spring apparatus according to one embodiment of the invention.

FIG. 2 depicts a spring apparatus according to one embodiment of the invention.

A spring apparatus 10 according to one embodiment of the invention, includes like the prior art prior art combination of the shock absorber and the spring, spring 12; shock absorber cylinder 18A extending along spring 12; shock absorber piston 18B extending from shock absorber cylinder 18A further along spring 12; top anchor 14A, for anchoring top of spring 12 to the top of shock absorber cylinder 18A; and bottom anchor 14B, for anchoring bottom of spring 12 to the bottom of shock absorber piston 18B.

In addition to the prior art prior art combination of the shock absorber and the spring, spring apparatus 10 further includes an embracing assembly 16, being fixed to spring 12 at a selected disposition along spring 12, such as at the middle.

Figure 3:
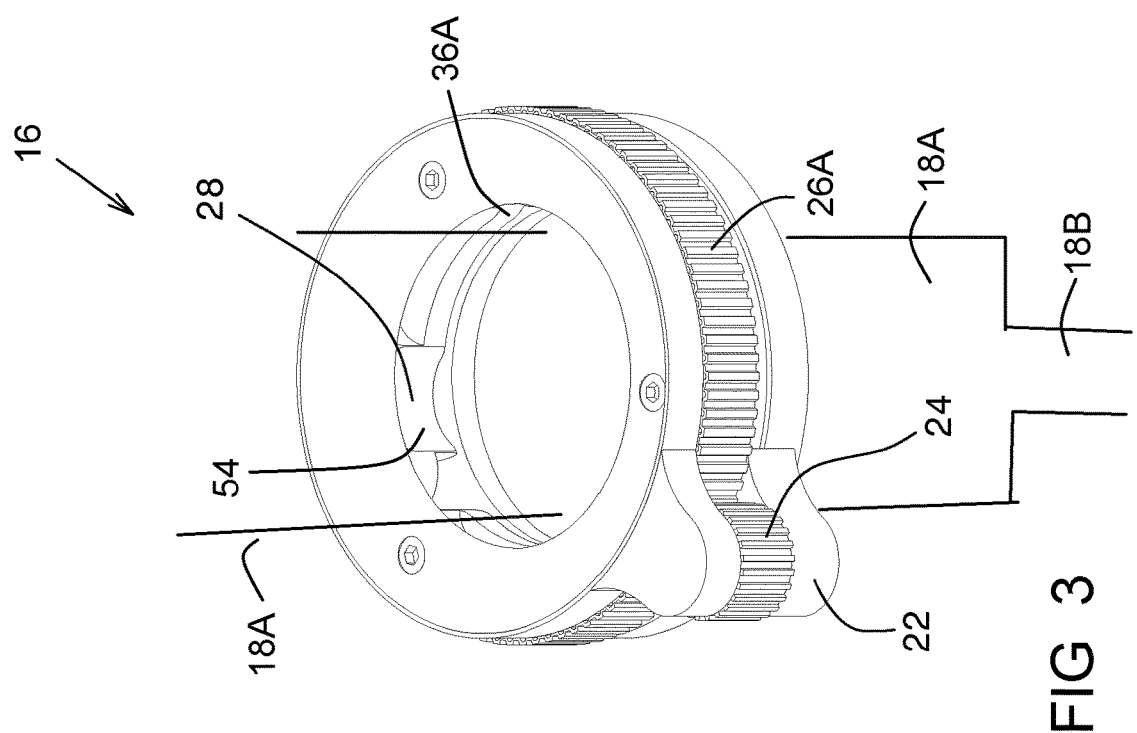
FIG. 3 is a perspective view of the embracing assembly of FIG. 2 at the non embracing state.

FIG. 3 is a perspective view of the embracing assembly of FIG. 2 at the non embracing state.

Figure 4:
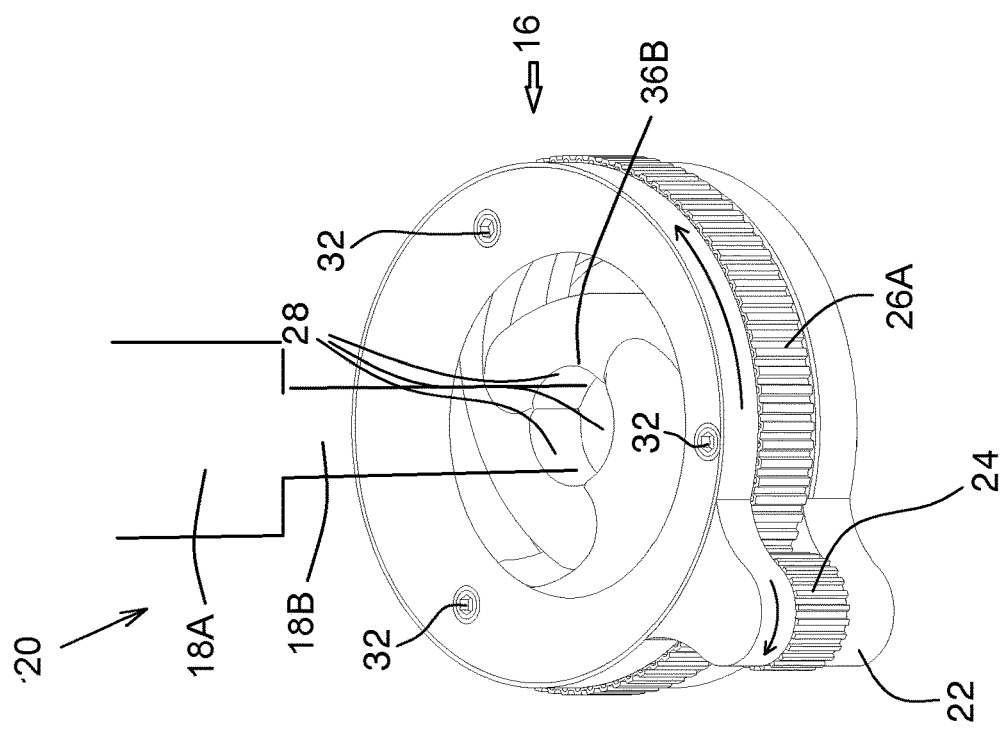
FIG. 4 is a perspective view of the embracing assembly of FIG. 3 at the embracing state.

FIG. 4 is a perspective view of the embracing assembly of FIG. 3 at the embracing state.

Embracing assembly 16 includes movable embracing members 28.

FIG. 5 is a perspective exploded view of the spring of the spring apparatus of FIG. 2.

A motorized cog 24 rotates a peripheral external cog 26A having an internal cog 26B, which rotates cogs 34 of embracing members 28, each about its hinge 50.

The motor of motorized cog 24 may be operated during use of spring 12, such as while the vehicle using spring 12 as a suspension, moves up and down.

Spring 12 includes a top 58A and bottom 58B sections, which may constitute different subsidiary springs, being connected to embracing assembly 16.

FIG. 6 explains the motion of the embracing member of FIG. 4.

Rotation of internal cog 26B rotates cog 34 and an arm 52 about hinge 50, thereby moving insoles 54 of embracing member 28 onto rod 18.

Figure 1:
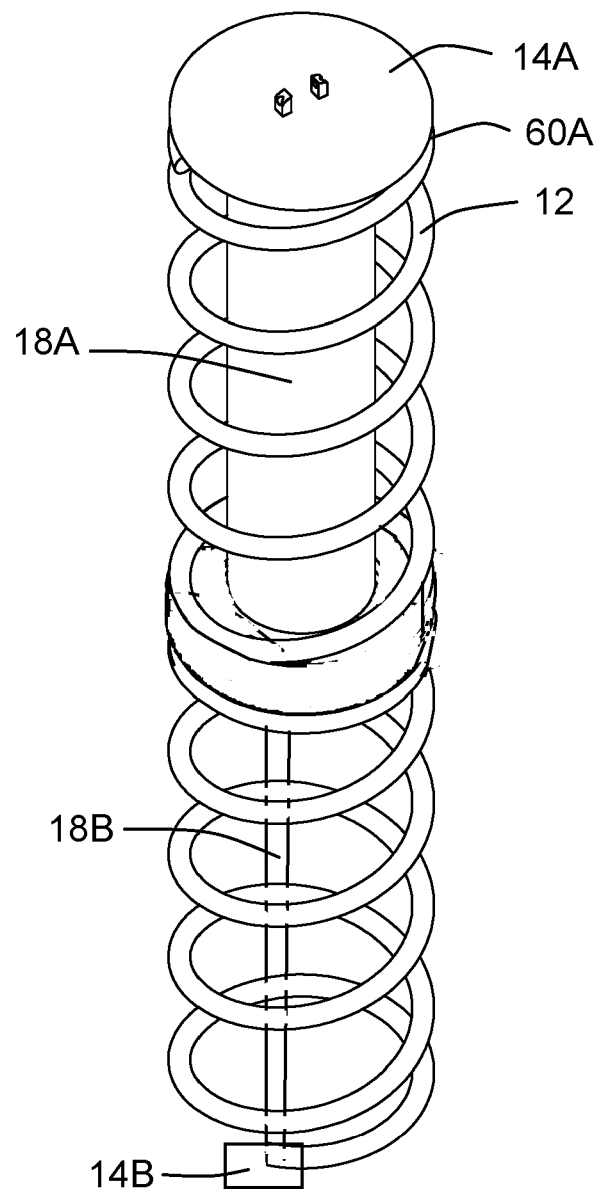
FIG. 1 depicts a prior art combination of a shock absorber and a spring.

Referring again to FIG. 3, at the non-embracing state, insoles 54 form a circle 36A having a diameter being larger than that of shock absorber cylinder 18A, thus at the non-embracing state, spring apparatus 10 functions equal to the prior art combination of the shock absorber and spring of FIG. 1.

Referring again to FIG. 4, at the embracing state, insoles 54 form a circle 36B having a diameter being smaller than that of shock absorber cylinder 18A, and being larger than that of shock absorber piston 18B.

Referring again to FIG. 2, in case embracing 16 in FIG. 2 is at the embracing state of FIG. 4, then embracing 16 cannot be disposed above the bottom of shock absorber cylinder 18A, thus maintaining a constant length to top section 58A of spring 12, thus bottom section 58B only works alone.

Figure 7:
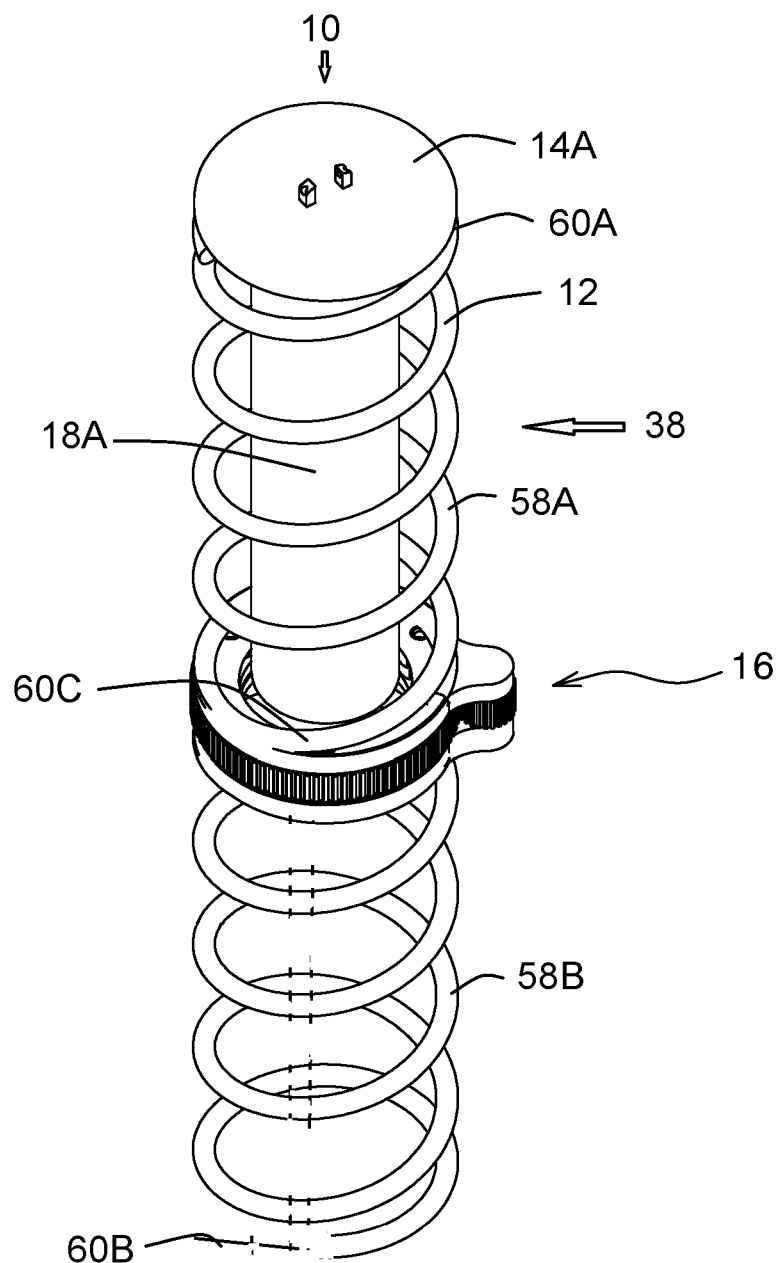
FIG. 7 depicts a spring apparatus according to another embodiment.

FIG. 7 depicts the spring apparatus of FIG. 2 according to another embodiment.

Cylinder 18A, even without piston 18B may provide the cancellation of the portion of spring 12.

Numeral 10 denotes the spring apparatus according to one embodiment of the invention;
12: spring;
14A: top anchor;
14B: bottom anchor;
16: embracing assembly;
18A: shock absorber cylinder;
18B: shock absorber piston;
20: shock absorber, including members 18A, 18B;
22: package;
24: cog;
26A: external peripheral cog;
26B internal peripheral cog;
28: embracing member including arm 52;
30: rotation of external and internal cogs 26A, 26B;

32: screw for closing package 22 of embracing assembly 16;
34: cog;
36A, 36B: circles formed by insoles of embracing members 28;
38: non-springy portion of spring 12 upon embracing cylinder 18A;
50: hinge;
52: arm;
54: insole;
58A, 58B: sections of spring 12;
60A, 60B: locations along spring 12.

The reference numbers in the claims should not be interpreted as limiting the claims in any form.

What is claimed is:

1. A spring apparatus (10), comprising:
a spring (12);
an elongated object (18A) disposed within and along said spring (12); and
a mode-changing assembly (16), for providing a first mode in which a non-springy portion (38) of said spring (12) being along said elongated object (18A) is not springy, and a second mode in which an entire of said spring (12) is springy,
wherein said elongated object (18A) is anchored to said spring (12) at a first location (60A) of said spring (12), and wherein said non-springy portion (38) of said first mode extends from said first location (60A) along said elongated object (18A),
wherein said mode-changing assembly (16) comprises an embracing assembly (16), being anchored to said spring (12) at a second location (60C) thereof, said embracing assembly (16) being configured to form a first aperture (36B) being smaller than a width of said elongated object (18A), thereby providing said first mode in which said non-springy portion (38) extends from said first (60A) to said second location (60C) along said elongated object (18A), and to form a second aperture (36A) being larger than a width of said elongated object (18A), thereby providing said second mode,
wherein said embracing assembly (16) comprises: embracing members (28) ending with insoles (54), and
wherein said embracing assembly (16) further comprises: a motorized cog (24) for rotating arms (52) of said embracing members (28), thereby said embracing is available during use of said spring (12).

2. The spring apparatus (10) according to claim 1, further comprising a shock absorber (20), comprising: a cylinder (18A) comprising said elongated object (18A) being anchored to said spring (12) at said first location (60A) of said spring (12; and a piston (18B) being anchored (14B) to said spring (12) at a third location (60B) thereof being beyond said non-springy portion (38) of said first mode.

3. A spring apparatus (10), comprising:
a spring (12);
an elongated object (18A) disposed within and along said spring (12); and
a mode-changing assembly (16), for providing a first mode in which a non-springy portion (38) of said spring (12) being along said elongated object (18A) is not springy, and a second mode in which an entire of said spring (12) is springy,
wherein said elongated object (18A) is anchored to said spring (12) at a first location (60A) of said spring (12), and wherein said non-springy portion (38) of said first mode extends from said first location (60A) along said elongated object (18A),
wherein said mode-changing assembly (16) comprises an embracing assembly (16), being anchored to said spring (12) at a second location (60C) thereof, said embracing assembly (16) being configured to form a first aperture (36B) being smaller than a width of said elongated object (18A), thereby providing said first mode in which said non-springy portion (38) extends from said first (60A) to said second location (60C) along said elongated object (18A), and to form a second aperture (36A) being larger than a width of said elongated object (18A), thereby providing said second mode,
wherein said embracing assembly (16) comprises: embracing members (28) ending with insoles (54), and
wherein said embracing assembly (16) further comprises: a peripheral internal cog (26B) for rotating a plurality of cogs (34), from each extending an arm (52) of one of said embracing members (28).

4. The spring apparatus (10) according to claim 3, further comprising a shock absorber (20), comprising: a cylinder (18A) comprising said elongated object (18A) being anchored to said spring (12) at said first location (60A) of said spring (12; and a piston (18B) being anchored (14B) to said spring (12) at a third location (60B) thereof being beyond said non-springy portion (38) of said first mode.

* * * * *